United States Patent [19]

Kusaka

[11] Patent Number: 5,036,348
[45] Date of Patent: Jul. 30, 1991

[54] CAMERA SYSTEM HAVING AN AUTOMATIC FOCUS ADJUSTING DEVICE

[75] Inventor: Yosuke Kusaka, Yokohama, Japan

[73] Assignee: Nikon Corporation, Tokyo, Japan

[21] Appl. No.: 312,660

[22] Filed: Feb. 21, 1989

[30] Foreign Application Priority Data

Feb. 25, 1988 [JP] Japan .................................. 63-42792

[51] Int. Cl.⁵ ........................ G03B 3/00; G03B 13/18
[52] U.S. Cl. .................................. 354/402; 354/195.12
[58] Field of Search ............... 354/402, 400, 403, 404, 354/405, 406, 407, 408, 409, 195.1, 195.12

[56] References Cited

U.S. PATENT DOCUMENTS 4,199,244 4/1983 Shenk .................................. 354/400

Primary Examiner—L. T. Hix
Assistant Examiner—Cassandra C. Spyron
Attorney, Agent, or Firm—Shapiro and Shapiro

[57] ABSTRACT

A camera includes a photo-taking optical system having a focusing lens movable in the direction of the optic axis for focus adjustment, a drive device for moving the focusing lens in the direction of the optic axis, a pulse generator means generating a pulse signal for each predetermined amount of movement of the focusing lens in the direction of the optic axis, a counter for counting the pulse signal, a memory, an electric power supply means for supplying electric power to the counter and a switch operated to stop and start the supply of electric power from the electric power supply to the counter. The counter is responsive to the operation of the switch for stopping the supply of electric power to write the content of the counter into the memory, and responsive to the operation of the switch for starting the supply of electric power to read the content of the memory. The counter counts the pulse signal on the basis of the read content of the memory.

10 Claims, 15 Drawing Sheets

F I G. 1 1
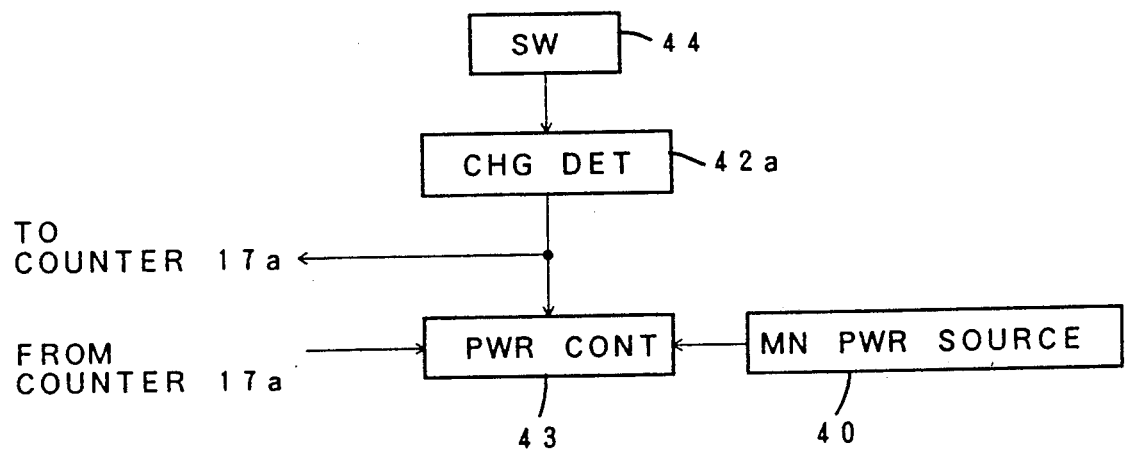

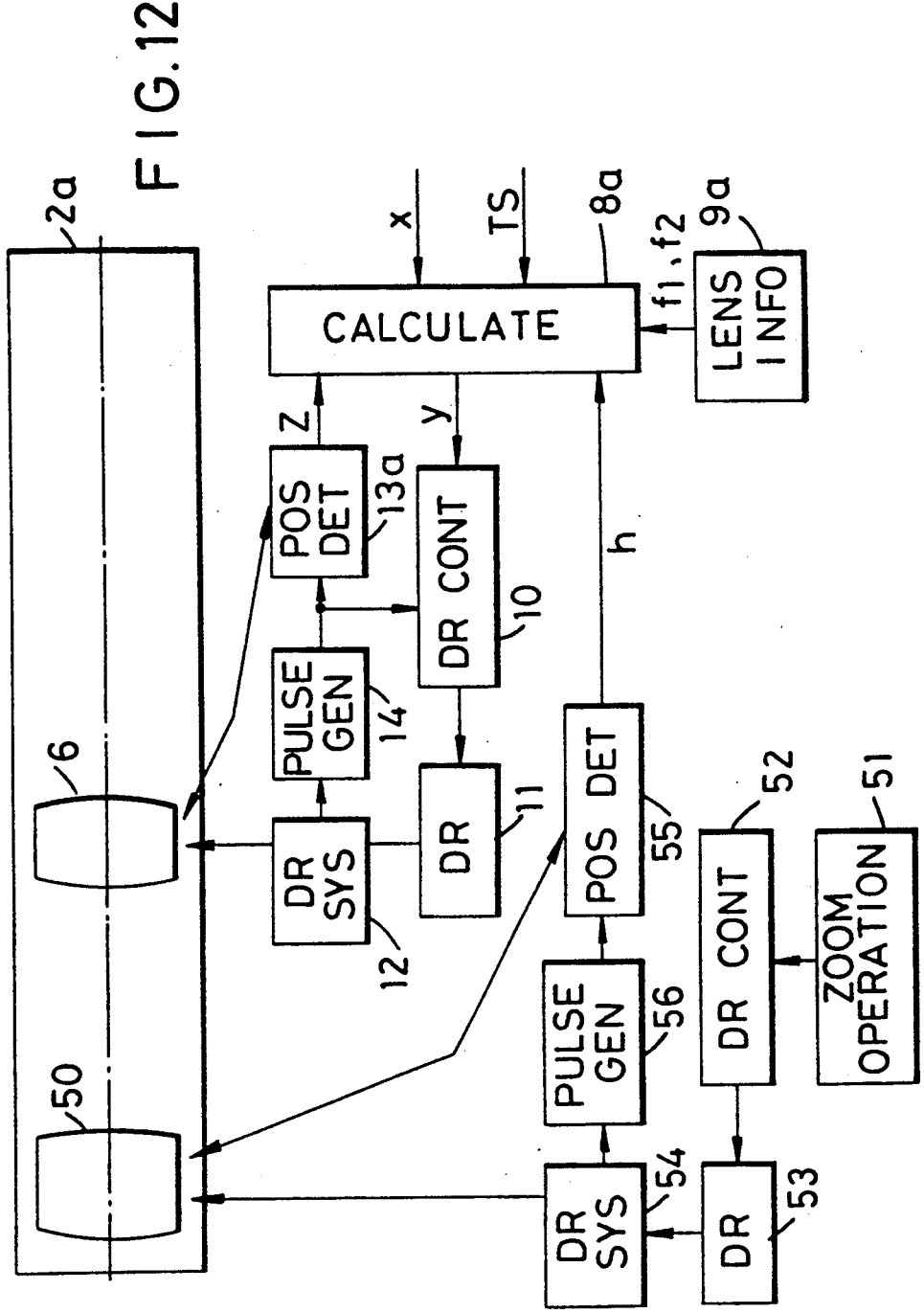

CAMERA SYSTEM HAVING AN AUTOMATIC FOCUS ADJUSTING DEVICE

BACKGROUND OF THE INVENTION

1. Field of the Invention

This invention relates to a camera system having an automatic focus adjusting device.

2. Related Background Art

The processing of the automatic focus adjusting device of a single-lens reflex camera is as follows.

The defocus amount of the image plane of an object and the surface of a film by a photo-taking optical system is detected, and this defocus amount is converted into the amount of movement of the lens of the photo-taking optical system to be moved until the photo-taking optical system becomes in focus (the image plane of the object coincides with the surface of the film), and the photo-taking optical system is moved by said amount of movement of the lens to thereby make the photo-taking optical system in focus.

In the above-described processing, the processing for converting the defocus amount into the amount of movement of the lens has heretofore been carried out as follows.

When the defocus amount x is found, it is converted into the amount of movement y of the lens by the following equation (1):

$$y = k \cdot x \quad (1)$$

In the equation (1), k is a conversion coefficient for converting the defocus amount into the amount of movement of the lens and is defined as follows:

$$k = w/u \quad (2)$$

In the equation (2), w is the minute amount of movement of the photo-taking optical system (in the case of a zoom lens or an internal focus type lens, the minute amount of movement of the focussing lens), and u is the minute amount of movement of the image plane of the object when the photo-taking optical system is moved by the minute amount of movement w.

In FIG. 13 of the accompanying drawings, there is shown the relation between the minute amount of movement w of the lens 2 and the minute amount of movement u of the image plane when the distance between the object O and the lens 2 is b and the distance between the lens and the image plane I is a.

Usually, the value of w/u is considered to be constant irrespective of the distance b between the object O and the lens 2 and k is determined to a predetermined value. For example, in the case of a totally moved type lens, when the object distance is assumed as ∞ (infinity), w=u and therefore, k=1. Also in the case of a zoom lens or an internal focus type lens, the value $k_1 = w/u$ of the equation (2) when the object distance is assumed as ∞ is adopted as the conversion coefficient k.

The approximation that w/u is constant irrespective of the distance b sufficiently holds true in popular lenses, but actually, w/u is varied by focusing and zooming and therefore, in a special lens such as a macro lens, the error of said approximation becomes great at a close distance.

In order to solve the above-noted problem, the applicant has proposed in Japanese Laid-Open Patent Application No. 62-170924 (corresponding U.S. application Ser. No. 245,967 filed on Sept. 16, 1988, now U.S. Pat. No. 4,841,325, issued June 20, 1989) the following equation (3) as the processing for converting the defocus amount x into the amount of movement of the lens:

$$y = \frac{x}{k \cdot (1 + l \cdot x)} \quad (3)$$

In the equation (3), the coefficients k and l are predetermined constants, and are varied by the focusing and zooming of the photo-taking optical system. For example, in a zoom lens, the zooming position of a magnification changing lens is divided into four zoom zones ZZ1-ZZ4 and the focusing position of a focusing lens is divided into five focusing zones FZ1-FZ5, and the current zoom zone ZZn and focusing zone FZm are discriminated by a zone discriminating encoder and further, coefficients kmn and lmn conforming to the zoom zone ZZn and the focusing zone FZm are determined as shown in the table below, and the determined kmn and lmn and the defocus amount x are substituted into the equation (3), whereby the amount of movement y of the lens can be found. In this table, as the number of ZZ becomes greater, the focal length becomes greater, and as the number of FZ becomes greater, infinity is approached.

TABLE

| FZ | ZZ | | | |
|----|-----|-----|-----|-----|
|    | 1   | 2   | 3   | 4   |
| 1  | k11 | k12 | k13 | k14 |
|    | l11 | l12 | l13 | l14 |
| 2  | k21 | k22 | k23 | k24 |
|    | l21 | l22 | l23 | l24 |
| 3  | k31 | k32 | k33 | k34 |
|    | l31 | l32 | l33 | l34 |
| 4  | k41 | k42 | k43 | k44 |
|    | l41 | l42 | l43 | l44 |
| 5  | k51 | k52 | k53 | k54 |
|    | l51 | l52 | l53 | l54 |

If this is done, the error of the amount of movement y of the lens becomes small as compared with the equation (1).

However, in a system for finding the amount of movement y of the lens by the use of the equation (3), if the number of focusing zones and the number of zooming zones are increased in an attempt to further enhance accuracy, the scale of the encoder for zone discrimination has become large and complex.

The table of the coefficients k and l also has become great and a memory for memorizing the table also has become great in capacity.

Also, in order to avoid the above-noted problems, it is possible to calculate and find the amount of movement y of the lens directly from the defocus amount x and the parameters of the optical system such as the lens position and the focal length, on the basis of the formula of the lens, but it has been difficult in terms of both space and cost to contain means for detecting the absolute position of the lens highly accurately in a camera body or in a lens barrel.

SUMMARY OF THE INVENTION

The camera system of the present invention adopts a construction which is provided with drive means for moving a lens, pulse generating means generating a pulse signal each time the lens is moved by a predetermined amount, focus detecting means for detecting the defocus amount of the lens, position detecting means for counting said pulse signal in conformity with the direction of movement of the lens and detecting the absolute position of the lens, lens information means for memorizing the focal length of the lens, movement amount calculating means for finding by calculation the amount of movement of the lens up to the in-focus state as a function of the defocus amount, the absolute position of the lens and the focal length of the lens, and drive control means for driving said drive means and counting said pulse signal generated with said driving to thereby control the amount of driving conforming to said amount of movement.

The present invention can find the amount of movement of the lens merely by calculation as described above, and eliminates the necessity of the coefficient table as used in the prior art and further, can markedly enhance the accuracy of the amount of movement of the lens if the accuracy of detection of the absolute position of the lens is enhanced as required. Also, the present invention eliminates the necessity of the complex zone discriminating encoder and can thus simplify the construction.

Also, the pulse signal for monitoring the amount of relative movement of the lens is used also for the detection of the absolute position of the lens, and this is advantageous in terms of space and cost.

BRIEF DESCRIPTION OF THE DRAWINGS

FIG. 11 shows a modification of the second embodiment.

FIG. 12 shows the construction of an automatic focus detecting device which is a third embodiment of the present invention.

DESCRIPTION OF THE PREFERRED EMBODIMENTS

The principle of the present invention will first be described with reference to FIG. 1.

It is to be understood that a lens 2 is of the type which effects focusing by axial movement of all groups. With a film surface F when out-of-focus occurs to a certain object 0 as a reference, the distance from the film surface F to the position of the lens 2 is Z and the distance from the film surface F to the position I of the image plane is x. Also, the deviation between the position of the lens 2 when the lens 2 is moved relative to the same object 0 and the position I of the image plane is brought into coincidence with the film surface F and the position Z of the lens 2 when out-of-focus occurs (the amount of movement of the lens) is y. The focal length of the lens is f.

Figures 1A, 1B:
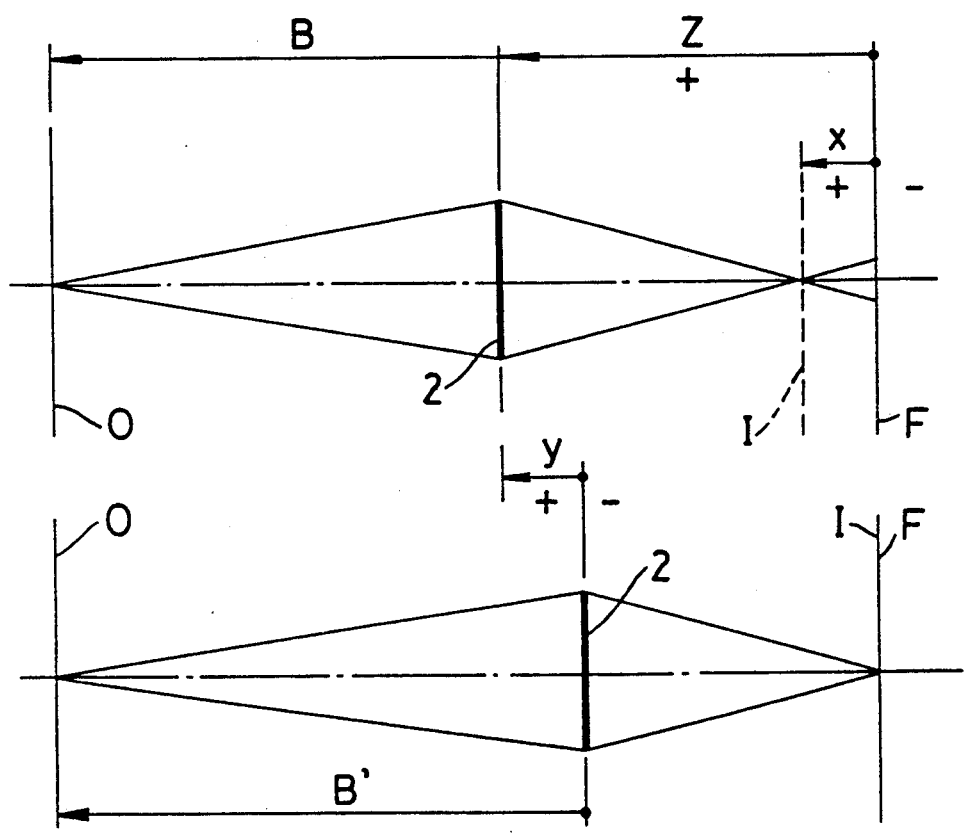
FIGS. 1 and 2 illustrate the principle of the automatic focus detecting device of the present invention.

Assuming that the distance between the object O and the lens 2 when out-of-focus occurs as shown in FIG. 1($a$) is B, B can be found from the formula of the lens by the use of the following equation:

$$B = \frac{(Z-x)\cdot f}{Z-x-f} \quad (4)$$

Also, assuming that the distance between the object O and the lens 2 when the lens is in focus as shown in FIG. 1($b$) is B', B' can likewise be found by the use of the following equation (5):

$$B' = \frac{(Z-y)\cdot f}{Z-y-f} \quad (5)$$

There is the relation of the following equation (6) between B and B'.

$$B = B' - y \quad (6)$$

If the equations (4) and (5) are substituted into the equation (6) to rearrange the latter equation with respect to y, the following equation (7) is obtained:

$$(Z-x-f)y^2 + (-Z^2 + xZ - xf + 2Zf)y - f^2 x = 0 \quad (7)$$

If the equation (7) which is a quadratic equation is solved, the amount of movement y of the lens can be found. Accordingly, the amount of movement y of the lens can be found from the defocus amount x, the position Z of the lens and the focal length f.

Instead of solving the equation (7) which is a quadratic equation, the amount of movement y of the lens can also be found by the use of approximation as shown in the equation (8) below.

If the amount of movement y of the lens is $y \ll f \cdot Z$ for the focal length f and the position Z of the lens, the first term of the equation (7) can be neglected as compared with the second and third terms of the same equation. Accordingly, if the equation (7) is rearranged with respect to y on the assumption that $(Z-x-f)y^2=0$, the following equations (8) and (8)' are obtained:

$$y = \frac{x\cdot f^2}{f^2 - (Z-f)^2 + (Z-f)\cdot x} \quad (8)$$

$$= \frac{x}{\left(1 - \frac{(Z-f)^2}{f^2}\right)\left(1 + \frac{Z-f}{f^2-(Z-f)^2}\cdot x\right)} \quad (8)'$$

In the equation (8)', it is seen that the coefficient k in the equation (5) corresponds to $1-(z-f)^2/f^2$ and that the coefficient l corresponds to $(Z-f)/\{f^2-(Zf)^2\}$.

Accordingly, if the defocus amount x, the position Z of the lens and the focal length f are substituted into the equation (8), the amount of movement y of the lens can be found by calculation.

The principle of the present invention for a zoom lens will now be described with reference to FIG. 2.

Figures 2A, 2B:
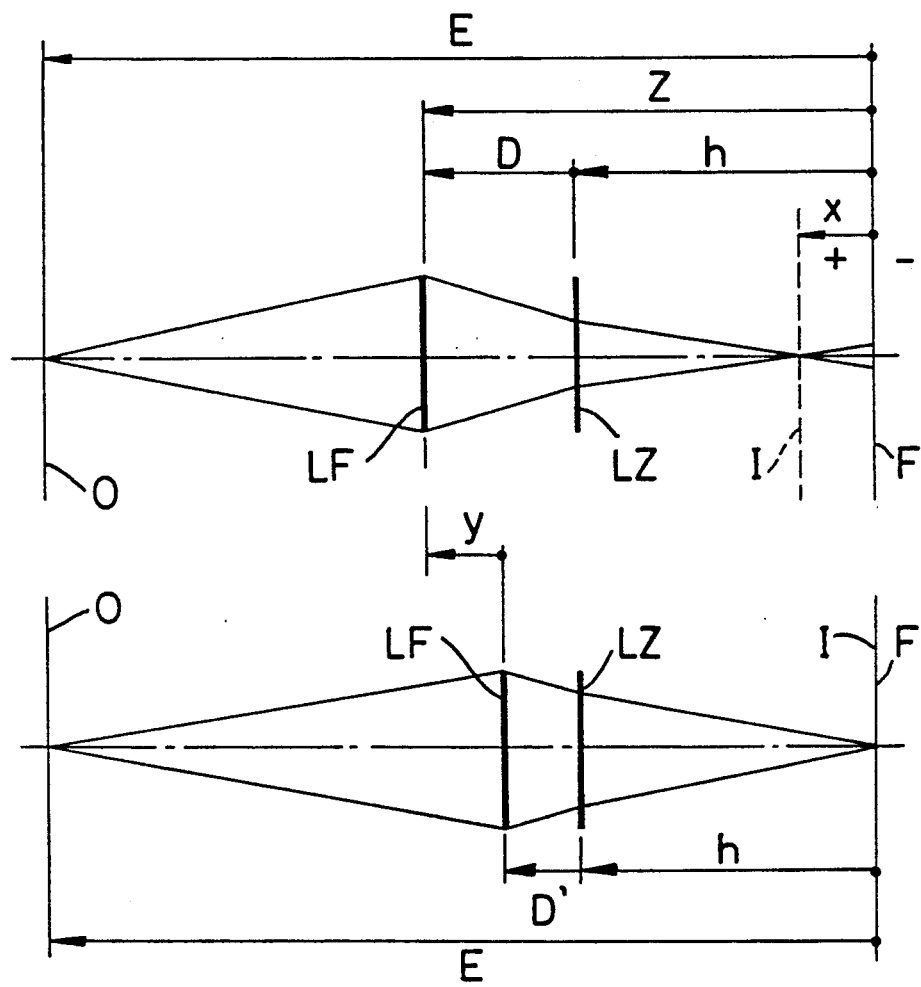

In FIG. 2, it is to be understood that when a focusing lens LF is at a position of a distance Z from the film surface F and a magnification changing lens LZ is at a position of a distance h from the film surface F, the defocus amount between the image plane I and the film surface F relative to a certain object O is x. FIG. 2(a) shows the non-in-focus state, and FIG. 2(b) show the in-focus state.

The amount of movement of the focusing lens LF when the focusing lens LF is moved relative tto the same object O and the image plane I is made in focus to the film surface F is y.

Also, the focal length of the focusing lens LF is $f_1$ and the focal length of the magnification changing lens is $f_2$. If the distance between the lens LF and the lens LZ when out-of-focus occurs and the distance between the lens LF and the lens LZ when in focus are D and D', respectively, D and D' are as shown by the following equations:

$$D=Z-h, \quad D'=D-y=Z-h-y \tag{9}$$

If the focal length of the composite optical system when out-of-focus occurs and the focal length of the composite optical system when in focus are F and F', respectively, F and F' are as shown by the following equations:

$$F = \frac{f_1 f_2}{f_1 + f_2 - D} \tag{10}$$

$$F' = \frac{f_1 f_2}{f_1 + f_2 - D'} = \frac{f_1 f_2}{f_1 + f_2 - D + y} \tag{11}$$

Also, the distance between the principal point of the composite optical system and the magnification changing lens LZ when out-of-focus occurs and the distance between said principal point and said magnification changing lens when in focus are S and S', respectively, the following equations are obtained.

$$S = \frac{f_2 D}{f_1 + f_2 - D} \tag{12}$$

$$S' = \frac{f_1 D'}{f_1 + f_2 - D'} = \frac{f_2(D - y)}{f_1 + f_2 - D + y} \tag{13}$$

But it is to be understood that S and S' are positive (+) when the focus of the composite optical system is at the right of the magnification changing lens LZ, and are negative (−) when the focus of the composite optical system is at the left of the magnification changing lens LZ.

Accordingly, if the distance between the principal point of the composite optical system and the image plane I when out-of-focus occurs and the distance between said principal point and said image plane I when in focus are A and A', respectively, A and A' are as shown by the following equations:

$$A = h + F - S - x \tag{14}$$

$$A' = h + F - S' \tag{15}$$

Next, assuming that the distance between the film surface F and the object O is E, E when out-of-focus occurs and E when in focus are as follows:

$$E = A + \frac{A \cdot F}{A - F} + x \tag{16}$$

$$E = A' + \frac{A' \cdot F}{A' - F} \tag{17}$$

If the equations (16) and (17) are rearranged by eliminating E and substituting the equations (14) and (15) thereinto, the following equation is obtained:

$$2F - S + \frac{F^2}{h - S - x} = 2F - S' + \frac{F^2}{h - S'} \tag{18}$$

If the equation (18) is further rearranged with respect to y by substituting the equations (11) and (13) thereinto, the following equation is obtained:

$$[f_2(h - f_2)(h - s - x) + \tag{19}$$

$$\{(h - s - x)(2F - S) + F^2\}(h - f_2)]y^2 +$$

$$[f_2(2f_1 + f_2)(h - s)(h - s - x) +$$

$$2F^2 \cdot (f_1 + f_2 - D)(h - s) - F^2 \cdot f_2^2]y + f_1^2 f_2^2 x = 0$$

If the quadratic equation of y in the equation (19) is solved, the amount of movement y of the lens can be found. In the equation (19), F, S and D can be found by substituting the focal lengths $f_1$ and $f_2$ and the positions Z and h of the lens into the equations (9), (10) and (12). Accordingly, the amount of movement y of the lens can be found from the focal lengths $f_1$ and $f_2$, the positions Z and h of the lens and the defocus amount x by calculation.

Instead of solving the equation (19) which is a quadratic equation, the amount of movement y of the lens can also be found as shown by the equation (20) below by the use of approximation.

If the amount of movement y of the lens is y << $f_1$, $f_2$, Z, h relative to the focal lengths $f_1$ and $f_2$ and the positions Z and h of the lens, the term regarding $y^2$ in the equation (19) can be neglected as compared with the primary term and the constant term regarding y. Accordingly, if rearrangement is made with respect to y on the assumption that the term regarding $y^2$ is 0, the following equation is obtained:

$$y = \frac{x}{\frac{F^2}{f_1^2}(1 - M)\left(1 + \frac{N}{1 - M} \cdot x\right)} \tag{20}$$

In the equation (20), M and N are as follows:

$$M = \frac{(h - S)}{f_2^2}\left\{2(f_1 + f_2 - D) + \frac{(h - S)}{F^2}(2f_1 f_2 + f_2^2)\right\} \tag{21}$$

$$N = \frac{(h - S)}{F^2 \cdot f_2^2}(2f_1 f_2 + f_2^2) \tag{22}$$

In the equation (20), it is seen that the coefficient k in the equation (3) corresponds to $(F^2/f_1^2) \cdot (1 - M)$ and that the coefficient l corresponds to $N/(1 - M)$. In the equations (21) and (22), F, S and D can be found by substituting the focal lengths $f_1$ and $f_2$ and the positions Z and h of the lens into the equations (9), (10) and (12).

Accordingly after all by the equation (20), the amount of movement y of the lens can be found from the focal lengths $f_1$ and $f_2$, the positions Z and h of the lens and the defocus amount x by calculation.

Although not described in detail herein, again in the construction of an optical system other than that of FIGS. 1 and 2, the amount of movement y of the focusing lens can be found as a function of the focal length and position of the partial optical system constituting the optical system and the defocus amount x by calculation in the same manner as the principle described previously.

First Embodiment

Figure 3:
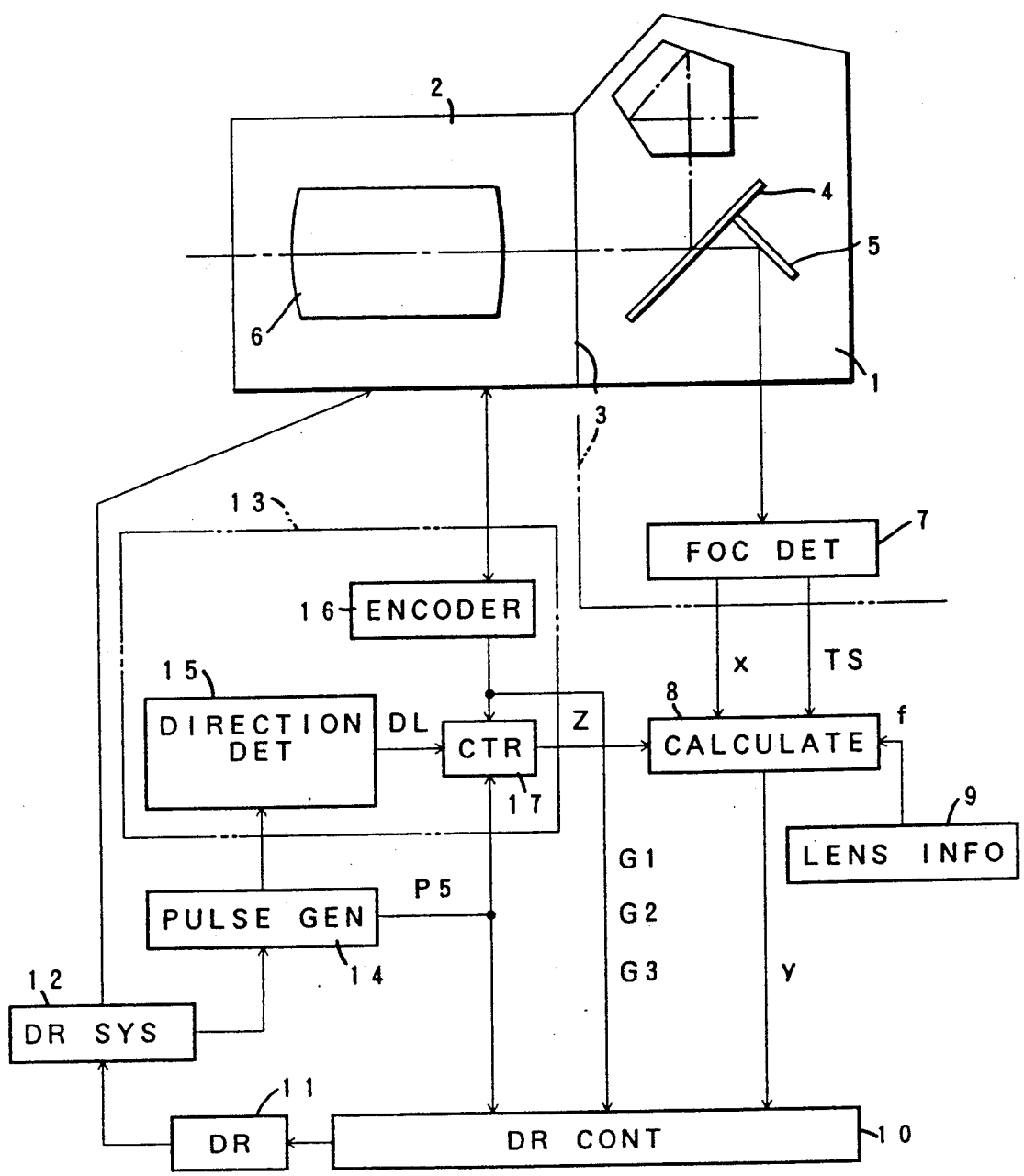
FIG. 3 shows the construction of an automatic focus detecting device which is a first embodiment of the present invention.

FIG. 3 shows the construction of a first embodiment of the present invention which is an embodiment in which the present invention is applied to a single-lens reflex camera body which effects TTL focus detection and an interchangeable lens which effects totally moved type focusing.

In FIG. 3, the reference numeral 1 designates a body, the reference numeral 2 denotes an interchangeable lens barrel, and the reference numeral 3 designates the mount of a body lens. A light flux passed through a photo-taking lens, i.e., a focusing lens 6, is partly reflected by a main mirror 4 and directed to a viewfinder portion and the remaining part of the light flux is transmitted through the main mirror 4, is reflected to the bottom of the body by a sub-mirror 5 and forms an object image. This object image is processed by conventional focus detecting means 7 comprising a focus detecting optical system, an image sensor, sensor output calculation processing means, etc., and the defocus amount x of the image plane of the object relative to the film surface is detected. The defocus amount x is sent to move amount calculating means 8 contained in the lens through an electrical contact provided on the mount 3.

Lens information means 9 is means for fixedly memorizing the focal length f of the focusing lens 6, and the move amount calculating means 8 finds the amount of movement y of the lens from said defocus amount x, the focal length f read out from the lens information means 9 and the position Z of the lens read out from position detecting means 13 which will be described later, by calculation on the basis of the equation (7) or (19), and sends it to focus drive control means 10.

The focus drive control means 10 converts the amount of movement y of the lens into a pulse number N and also determines the direction of driving of drive means 11 including a motor in conformity with the sign of the amount of movement y of the lens. For example, it determines the direction of driving so that the focusing lens 6 is moved toward the close distance when the sign of y is − (minus), and is moved toward ∞ when the sign of y is + (plus). Subsequently, the drive means 11 starts to drive in the determined direction of driving. At the same time, counting of a pulse generated by pulse generating means 14 to be described with the driving is started, and each time a pulse is counted, the converted pulse number N is decremented by 1. At a point of time whereat the pulse number becomes 0, the driving of the drive means 11 is stopped. The drive means 11 is connected to the focusing lens 6 through a drive system 12 comprised of a gear, etc., and by the driving of the drive means, the focusing lens 6 can be moved in the direction of the optic axis.

The drive system 12 is also connected to the pulse generating means 14. The drive system 12 is designed such that a predetermined proportional relation is always maintained between the amount of driving of the drive means 11 and the amount of movement of the focusing lens 6 in the direction of the optic axis.

Accordingly, the pulse generating means 14 generates a pulse irrespective of the absolute position of the focusing lens 6 each time the focusing lens 6 is moved by a predetermined amount Δ.

Figure 4:
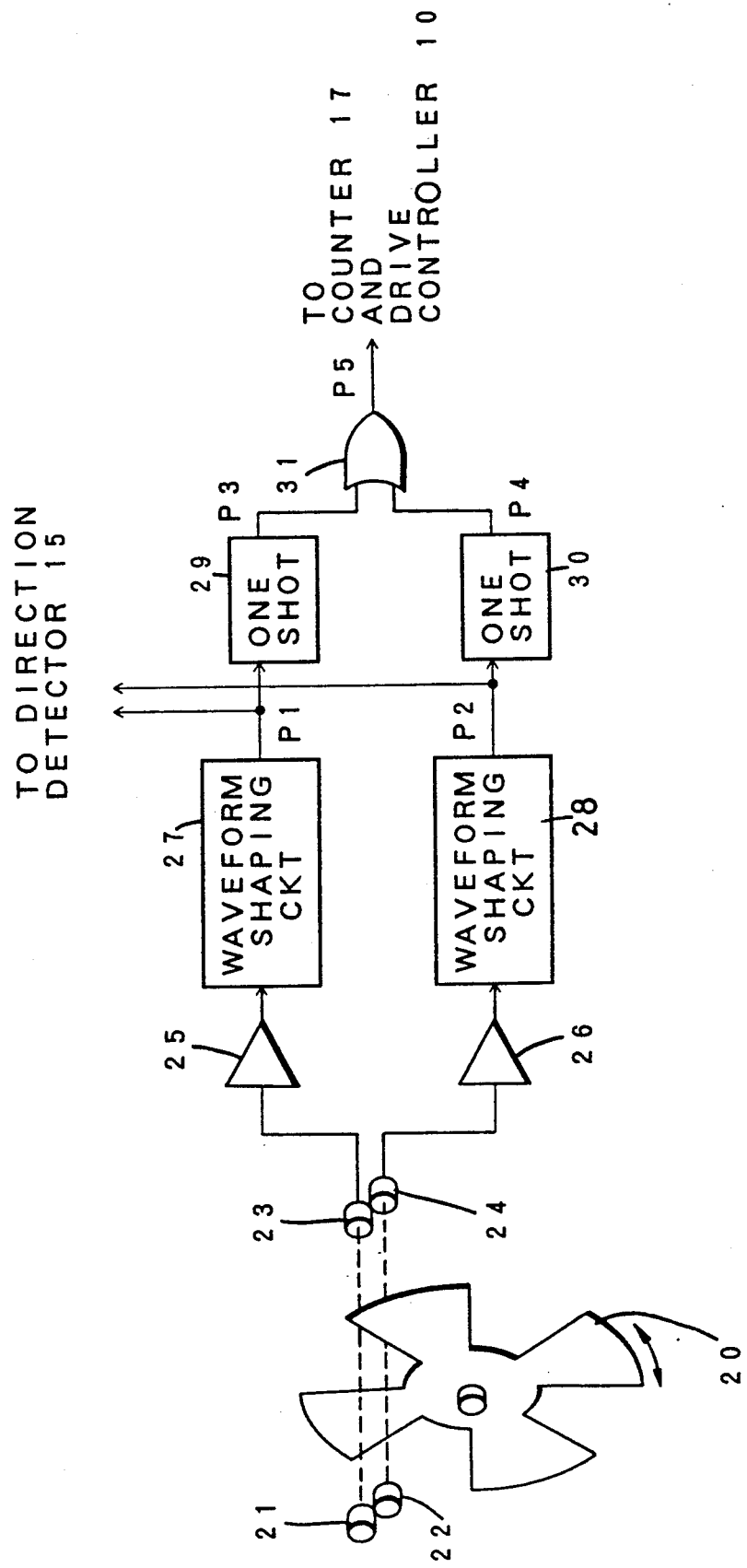
FIG. 4 shows the construction of the pulse generating means of the automatic focus detecting device.

FIG. 4 shows the detailed construction of the pulse generating means 14.

Referring to FIG. 4, a chopper 20 is connected to the drive system 12, and during the driving of the drive means 11, it is rotated to thereby intermittently cut off an optical path comprising a set of light emitting diode 21 and phototransistor 23 and a set of light emitting diode 22 and phototransistor 24.

The arrangement of said two sets of diodes and phototransistors is set so that the output waveforms of the two phototransistors are 90° out of phase with each other when the chopper 20 is rotated at a constant speed. The output of the phototransistors 23 and 24 are amplified by amplifiers 25 and 26, respectively, whereafter they are shaped by waveform shaping circuits 27 and 28, respectively, and provide signals P1 and P2.

Figure 5:
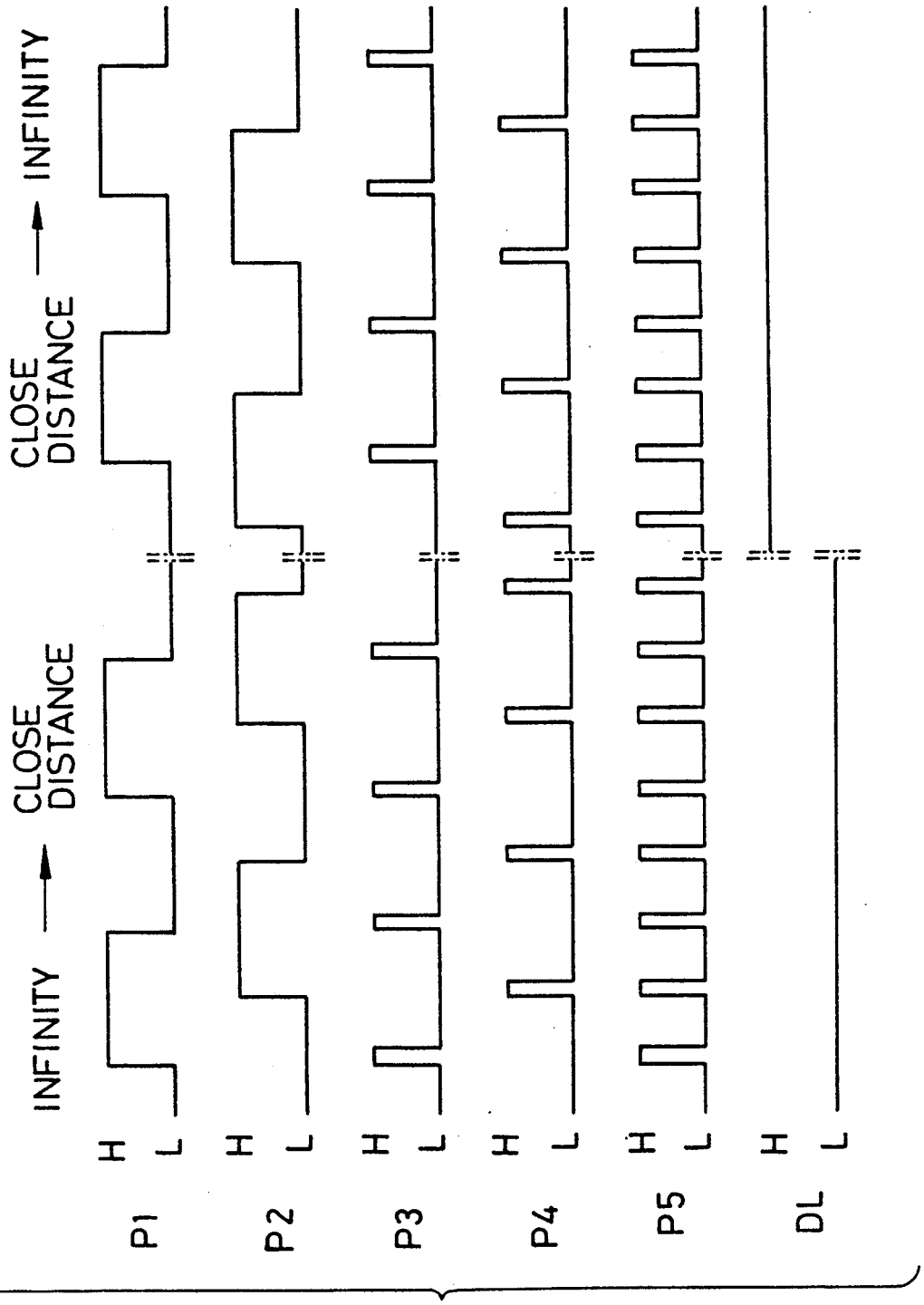
FIG. 5 shows the signal wave forms of the pulse generating means.

FIG. 5 shows the waveforms of the pulse signals P1 and P2. As shown in FIG. 5, the phases of the pulse signal P1 and P2 are opposite in the direction of out-of-phase because the direction of rotation of the chopper when the focusing lens 6 is being moved from ∞ toward the close distance is opposite to the direction of rotation of the chopper when the focusing lens 6 is being moved from the close distance toward ∞.

The pulse signals P1 and P2 are sent to direction detecting means 15 for the detection of the direction of movement and also are input to one shot circuits 29 and 30. The one shot circuits 29 and 30 are designed to generate pulse signals P3 and P4 during the rising and the falling of the input signals P1 and P2. The pulse signals P3 and P4 are converted into a pulse signal P5 by an OR circuit 31, and the pulse signal P5 is sent to the drive means 10 and a counter 17.

The waveforms of the pulse signals P3, P4 and P5 are shown in FIG. 5.

OR circuit 31 generates the pulse signals P5 of a pulse for each amount of movement Δ of the focusing lens 6 determined by the reduction ration of the drive system 12 between the chopper 20 and the focusing lens 6 and the number of divisions of the blade of the chopper 20.

The amount of movement Δ is a value predetermined for each interchangeable lens, and is used in such a manner that $N=|y|/2$ when the focus drive means 10 converts the amount of movement y of the lens into a pulse number N. If the drive means 11 is stopped at a point of time whereat the focus drive means 10 has counted N pulses, the focusing lens 6 is moved by $|y|$ in the direction of the optic axis, and the image plane of the object becomes coincident with the film surface and thus, the in-focus state is brought about.

The direction detecting means 15 receives as inputs the pulse signals P1 and P2 from the pulse generating means 14, and discriminates between the phases of the pulse signals P1 and P2. If as shown in FIG. 5, the phase of the pulse signal P2 is delayed by 90° relative to the phase of the pulse signal P1, the close distance is selected as the direction of movement of the lens and a direction signal DL is rendered into "L", and if the phase of the pulse signal P2 is advanced by 90° relative to the phase of the pulse signal P1, ∞ is selected as the direction of movement of the lens and the direction signal DL is rendered into "H" and is sent to the counter 17. The signal waveform of the direction signal DL is shown in FIG. 5.

The position detecting means 13 is comprised of direction detecting means 15, an encoder 16 and the counter 17. The encoder 16 is means for detecting the particular positions of the focusing lens 6, for example, infinity (hereinafter referred to as ∞), the close distance, and a predetermined middle point. The output of the encoder 16 is used to move the focusing lens 6 to a particular position during the closing of the main switch in order to initially set the output of the counter during the closing of the main switch, and is used to reset the content of the counter 17 when the focusing lens 6 has come to a particular position, in order to reset the cumulative error of the counter 17. Here, infinity, the close distance and the middle point are generically named the reset position.

Figure 6:
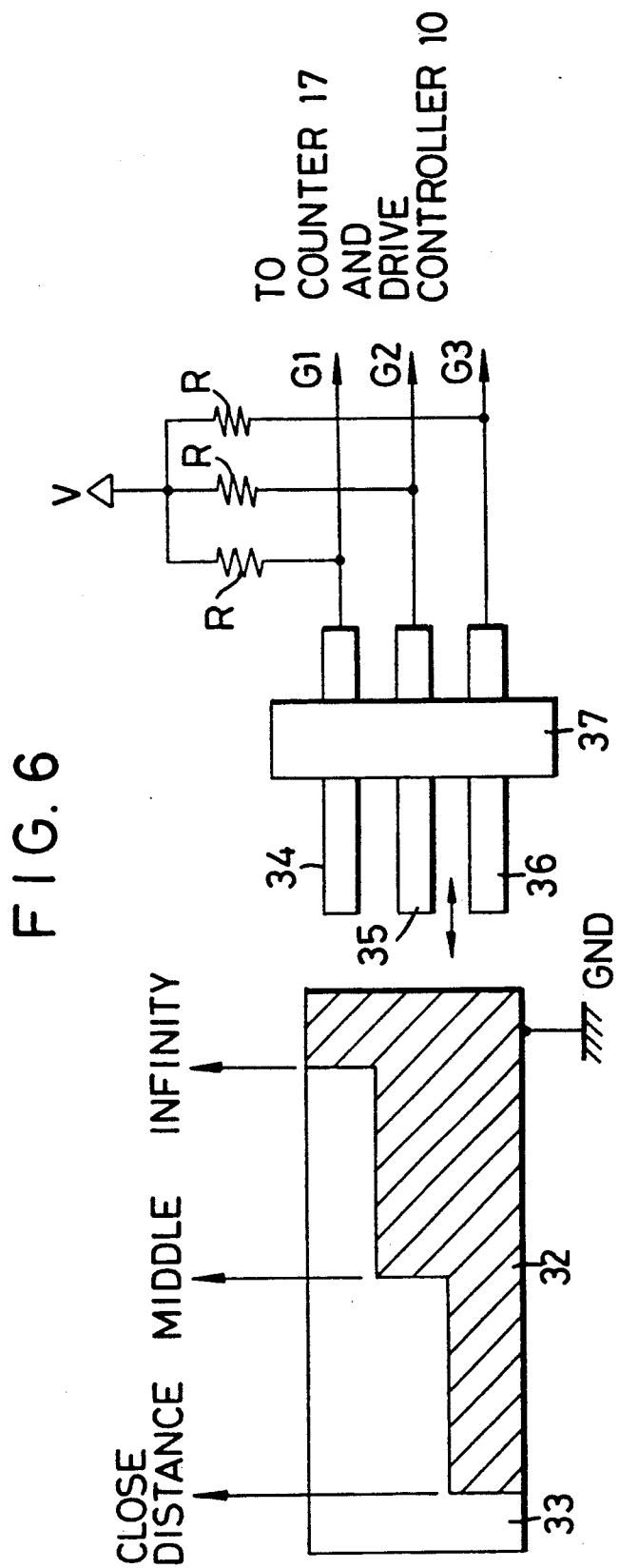
FIG. 6 shows the construction of the encoder of the automatic focus detecting device.

FIG. 6 shows the detailed construction of the encoder 16. Referring to FIG. 6, a pattern comprising an electrically conductive portion 32 and an electrically non-conductive portion 33 is secured to the focusing lens 6. The electrically conductive portion 32 is grounded.

Also, electrically conductive brushes 34, 35 and 36 and an electrically non-conductive member 37 for fixing the brushes are secured to the fixed barrel of the lens, and the brushes 34, 35 and 36 are arranged so as to contact with the pattern at a point while sliding on the pattern in the direction of the arrow with the movement of the focusing lens 6. Also, the arrangement of the pattern and the brushes in the direction of sliding is regulated so that the point of contact of the brush 34 provides the boundary portion between the electrically conductive pattern and the electrically non-conductive pattern when the focusing lens 6 is at ∞, that the point of contact of the brush 35 provides the boundary portion between the electrically conductive pattern and the electrically non-conductive pattern when the focusing lens 6 is at the middle point, and that the point of contact of the brush 36 provides the boundary portion between the electrically conductive pattern and the electrically non-conductive pattern when the focusing lens 6 is at the close distance.

Also, the brushes 34, 35 and 36 are pulled up to a power source voltage V through resistors R, and the potentials of the brushes 34, 35 and 36 are "L" when each brush is in contact with the electrically conductive portion, and are "H" when each brush is in contact with the electrically non-conductive portion.

Signals generated by the brushes 34, 35 and 36 are connected as signals G1, G2 and G3 to the counter 17 and the focus drive control means 10. Accordingly, in the counter 17 and the focus drive control means 10, it can be detected at a point of time whereat a change occurs to the output patterns of the signals G1, G2 and G3 that the focusing lens 6 has passed through a particular position.

For example, when the signal G1 has become "H"→"L" or "L"→"H", the focusing lens 6 has passed through ∞, and when the signal G2 has become "H"→"I" or "L"→"H", the focusing lens 6 has passed through the middle position, and when the signal G3 has become "H"→"L" or "L"→"H", the focusing lens 6 has passed through the close distance position.

As previously described, when the main switch is ON, the value of the counter is set to a predetermined value, for example, the initial value 0 when the focusing lens 6 is at ∞ and therefore, correspondence to the initial position of the focusing lens 6 is not secured. So, when the main switch is ON, the focus drive control means 10 drives the drive means 11 to thereby move the focusing lens 6 toward ∞. When a change occurs to one of the signals G1, G2 and G3 with the movement of the focusing lens 6, the counter 17 resets its content in conformity with the signal to which a change has occurred.

For example, when a change has occurred to the signal G1, the content of the counter is reset to a value 0 conforming to the ∞ position of the focusing lens 6, and when a change has occurred to the signal G2, the content of the counter is reset to a value conforming to the middle position, and when a change has occurred to the signal G3, the content of the counter is reset to a value conforming to the close distance position.

The above-described resetting of the content of the counter accompanying the change in the level of the signals G1, G2 and G3 is always effected after the closing of the main switch, and it also has the effect of resetting the cumulative count error of the counter 17.

The focus drive control means 10 discontinues the driving of the focusing lens 6 toward ∞ during the closing of the main switch at a point of time whereat a change in the level has occurred at first to one of the signals G1, G2 and G3 after the closing of the main switch, and moves the focusing lens 6 in accordance with the amount of movement y of the lens sent from the move amount calculating means 8 thereafter.

The counter 17 increments the count content thereof by 1 if the direction signal DL output by the direction detecting means 15 is "L" during the rising of the pulse signal P5 generated by the pulse generating means 14, and decrements the count content thereof by 1 if the direction signal DL is "H". Also, the design is such that when a change has occurred to the potentials of the output signals G1, G2 and G3 of the encoder 16, the count content is reset in conformity with the kind of the signal to which the change has occurred, as previously described. Also, when the move amount calculating means 8 has demanded the lens position Z, if the count content is, e.g. n, the lens position Z found by effecting the calculation of $Z = \Delta x n + Z'$ is sent to the move amount calculating means. Z' is the distance in the direction of the optic axis from the film surface at the ∞ position of the focusing lens 6. During the closing of the main switch, the count content is set to a value 0 corresponding to the lens position ∞.

Since the position detecting means 13 is designed as described above, it can always detect the absolute position Z of the focusing lens 6 from the film surface. Also, the resolving power of position detection can be enhanced as compared with the conventional position detecting means using only an encoder, by securing the reduction ratio of the drive system 12 greatly and at the same time, uses the same pulse as that used for drive control and therefore, the accuracy of position detection can be made the same as the accuracy of position control in drive control.

Figure 7:
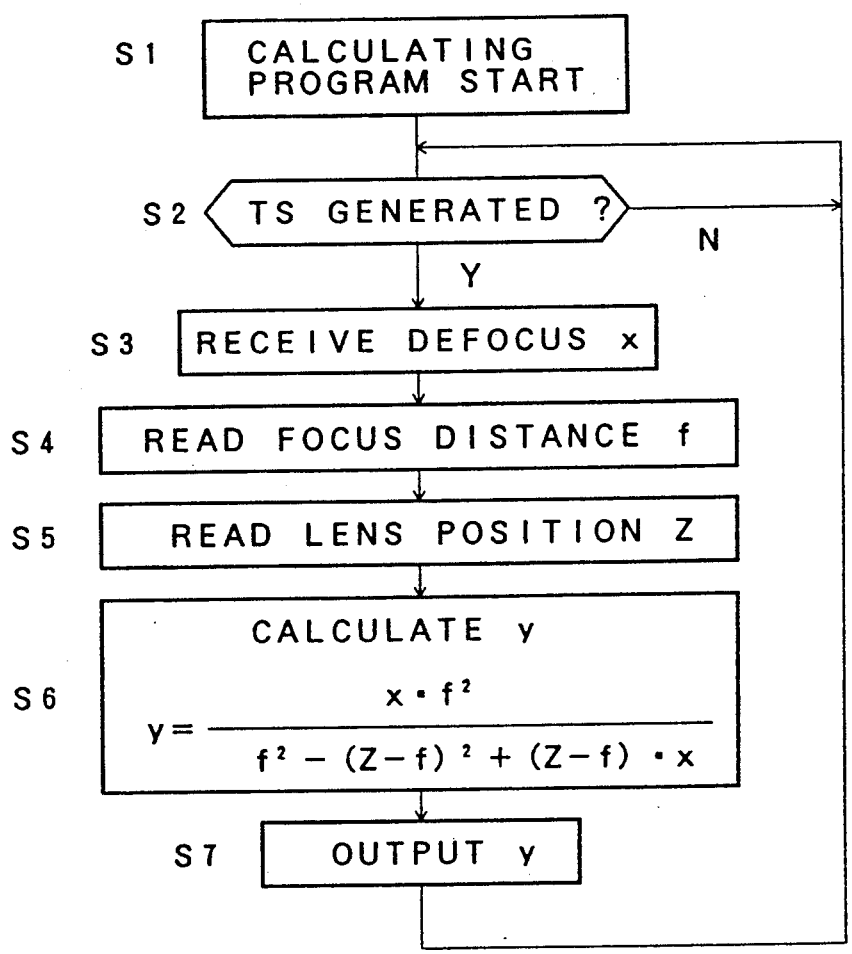
FIG. 7 is the operation flow chart of the movement amount calculating means of the automatic focus detecting device.

FIGS. 7, 8 and 9 show the operation flow charts in a case where the move amount calculating means 8, the focus drive control means 9 and the counter 17 of the position detecting means 13 in the first embodiment are comprised of microcomputers.

The move amount calculating means 8 starts to operate from the step S1 of FIG. 7 by the closing of the main switch. The focus detecting means 7 contained in the body generates a transmission signal TS during the transmission of the defocus amount x. At step S2, the calculating means 8 detects the generation of the transmission signal, and when the transmission signal is generated, advance is made to step S3, where the defocus amount x is received from the focus detecting means 7. At step S4, the focal length f of the focusing lens 6 is read from the lens information means 9. At step S5, the lens position Z of the focusing lens 6 is read from the position detecting means 13. At step S6, the amount of movement y of the lens is calculated from the defocus amount x, the focal length f and the lens position Z on the basis of the equation (7) or (8). At step S7, the amount of movement y of the lens found at step S6 is sent to the focus drive control means 10, and return is made to step S2, where the demand for communication from the focus detecting means is waited for. What has been described above is one loop of the operation of the move amount calculating means 8.

Figure 8A:
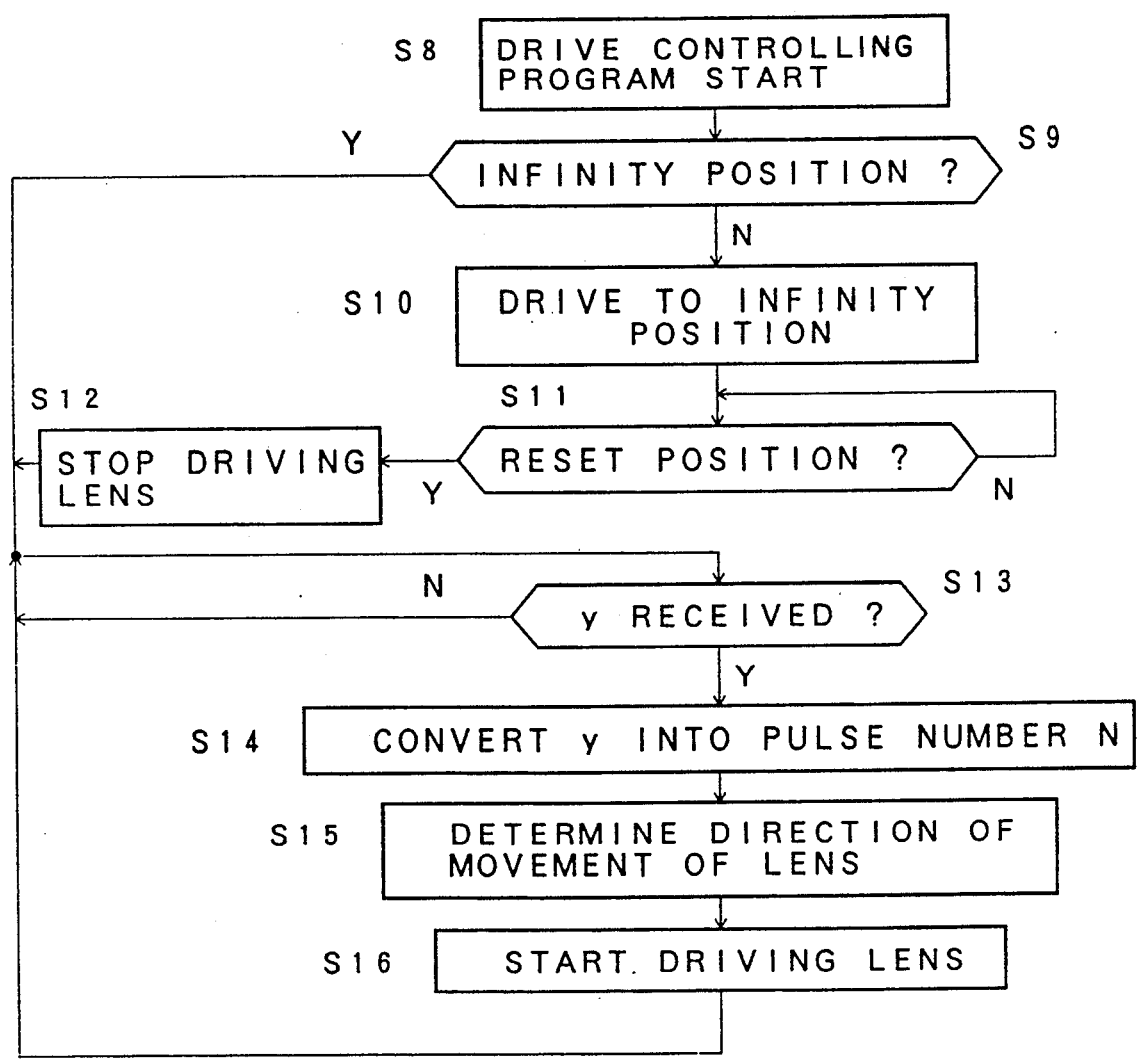
FIGS. 8A and 8B are the operation flow charts of the focus drive control means of the automatic focus detecting device.

The focus drive control means 10 starts to operate from the step S8 of FIG. 8A by the closing of the main switch.

At the start of the operation, it is necessary to move the focusing lens 6 to a particular position and initialize it in order to make the position of the focusing lens correspond to the content of the counter 17 of the position detecting means 13. So, at step S9, the output level pattern of the output signals G1, G2 and G3 of the encoder 16 is examined and whether the position of the focusing lens is the ∞ position is examined. If the position of the focusing lens is the ∞ position, advance is made to step S13 without the focusing lens 6 being moved. This is because the content of the counter 17 during the closing of the main switch is 0 and corresponds to the ∞ position. If at step S9, the position of the focusing lens is not the ∞ position, the drive means 11 is driven at step S10 to thereby cause the focusing lens 6 to start to move toward ∞. At step S11, a change in the output levels of the output signals G1, G2 and G3 of the encoder 16 is detected, and the step S11 is repeated until a change is detected. When a change has occurred to one of the output signals G1, G2 and G3 of the encoder 16, that is, when the focusing lens is in the reset position, step S12 branches off from the step S11, and it is judged that the focusing lens 6 has arrived at the particular position and the correspondence to the content of the counter 17 has been secured, and the driving of the drive means 11 is stopped to thereby stop the focusing lens 6.

When the initialization of the focusing lens 6 is completed in the manner described above, at step S13, the amount of movement y of the lens to be sent from the move amount calculating means 8 is awaited. When at step S13, the amount of movement y of the lens is sent, the program branches off to step S14, where the pulse number N is found by $|y|/\Delta$, as previously described, in order to make the amount of movement y of the lens correspond to the pulse number generated by the pulse generating means 14.

At step S15, the direction of driving of the drive means 11, i.e., the direction of movement of the focusing lens 6, is determined in conformity with the sign of the amount of movement y of the lens, and at step S16, the driving of the drive means 11 is started in the determined direction of driving.

After the driving has been started, return is made to step S13, where the next amount of movement y of the lens to be sent from the move amount calculating means 8 is waited.

Figure 8B:
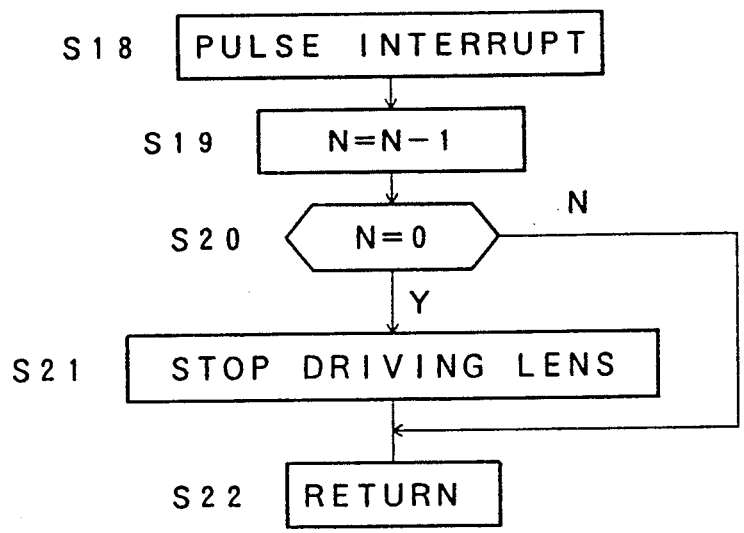

FIG. 8B shows a program for the control of the amount of driving of the focus drive control means 10. When the driving of the drive means 11 is started by the step S16 of FIG. 8A, the amount of driving is monitored by the pulse number generated by the pulse generating means 14, and the driving is stopped at a point of time whereat a predetermined pulse number N is reached.

By the generation of the pulse from the pulse generating means 14, pulse interrupt processing starts from step S18.

At step S19, what is the pulse number N minus 1 is newly described as the pulse number N.

At step S20, whether N has become 0 is tested, and if N is not 0, return is made at step S22. If at step S20, N is 0, it is judged that the focusing lens 6 has arrived at the in-focus point, and at step S21, the driving of the drive means 11 is stopped, and then return is made at step S22.

Figure 9A:
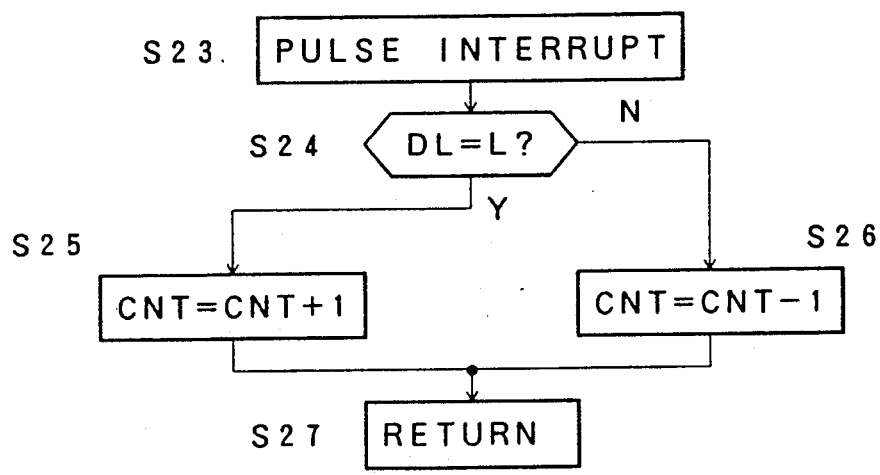
FIGS. 9A, 9B and 9C are the operation flow charts of the counter of the automatic focus detecting device.

What has been described above is the operation of the focus drive control means 10. The operation of the counter 17 of the position detecting means 13 will now be described. FIG. 9A shows the pulse counter processing of the counter 17, and by the pulse generation of the pulse generating means 14, pulse interrupt processing starts from step S23. At step S24, the level of the direction signal DL from the direction detecting means 15 is tested and whether the direction of movement of the focusing lens 6 is toward the close distance or toward ∞ is examined. If the direction of movement of the focusing lens 6 is toward the close distance, advance is made to step S25, where the count content CNT incremented by 1 is newly determined as CNT, and return is made from step S27.

Also, if the direction of movement of the focusing lens is toward ∞, advance is made to step S26, where the count content CNT decremented by 1 is newly determined as CNT, and return is made from step S27.

Figure 9B:
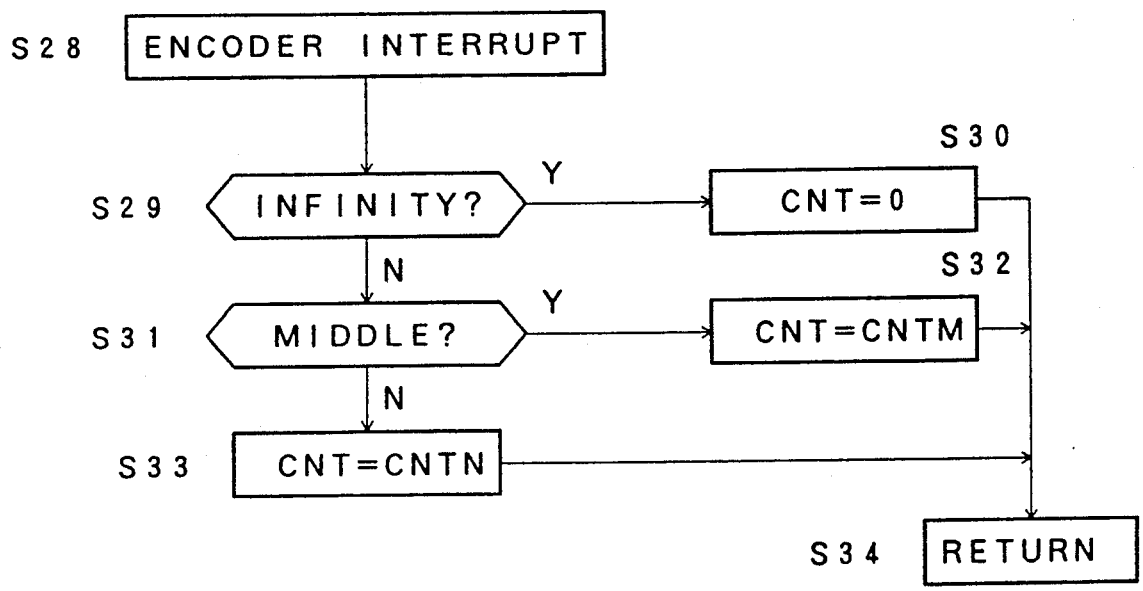

FIG. 9B shows the count content reset processing of the counter 17. When the focusing lens 6 has arrived at the particular position ∞, the middle point or the close distance position, the count content is corrected to a count value 0, CNTM or CNTN corresponding to the predetermined ∞ position, middle position or close distance position, and the cumulative error by the pulse count is reset and also, during the movement of the focusing lens 6 immediately after the closing of the main switch, the initialization of the count content of the counter 17 for the lens position of the focusing lens 6 is effected.

If a level change occurs to one of the output signals G1, G2 and G3 of the encoder 16, the encoder interrupt processing starts at step S28.

At step S29, whether the output signal to which an output change has occurred is the output signal G1 is tested, and if said output signal is the output signal G1, that is, if the focusing lens 6 has passed through the ∞ position, advance is made to step S30, where the count content CNT is set to a count content O corresponding to the ∞ position, and return is made from step S34.

If at step S29, the output signal to which an output change has occurred is not the output signal G1, the program branches off to step S31, where whether the output signal to which an output change has occurred is the output signal G2 is tested, and if said output signal is the output signal G2, that is, if the focusing lens 6 has passed through the middle position, advance is made to step S32, where the count content CNT is set to a count content CNTM corresponding to the middle position, and return is made from step S34.

If at step S31, the output signal to which an output change has occurred is not the output signal G2, it is judged that the output signal to which an output change has occurred is the output signal G3, that is, the focusing lens 6 has passed through the close distance position, and advance is made to step S33, where the count content CNT is set to a count content CNTN corresponding to the close distance position, and return is made from step S34.

Figure 9C:
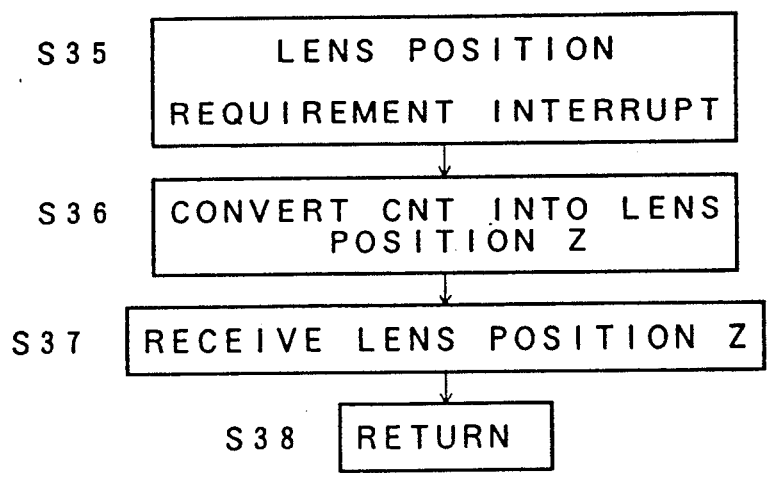

FIG. 9C shows the processing when there has been the demand for the lens position Z from the move amount calculating means 8.

By the demand for the lens position Z from the move amount calculating means 8, lens position demand interrupt starts from step S35.

At step S36, the count content CNT is converted into the lens position Z by $Z = \Delta \cdot CNT + Z'$, as previously described.

At step S37, the lens position Z found at step S36 is transmitted to the move amount calculating means 8, and return is made at step S38. What has been described above is the operation of the counter 17.

In the first embodiment, the move amount calculating means 8, the focus drive control means 10 and the position detecting means 13 are constructed and operate as described above and therefore, the lens position Z can be detected highly accurately and the amount of movement y of the lens can also be found highly accurately merely by calculation on the basis of the defocus amount x, the lens position Z and the focal length f. The detection of the absolute position of the lens is effected by the utilization of the pulse signal for the control of the amount of driving, and this is advantageous in terms of space and cost.

In the above-described first embodiment, the encoder 16 discriminates between the three particular points (∞, the middle point and the close distance ) of the focusing lens, but of course, the number of particular points may be more or less than three.

Also, a photointerrupter comprising two sets of light emitting diodes and phototransistors is utilized as the pulse generating means 14, but this is not restrictive. The pulse generating means may be any means for detecting the amount of driving of the drive system 12 and generating a pulse. For example, it is also possible to form a radial pattern comprising electrically conductive portions and electrically non-conductive portions on a disk connected to the drive system and rotated, bring an electrically conductive brush into contact with said pattern and generate an electrical pulse during the rotation of the disk.

Also, in the first embodiment, the direction of movement of the focusing lens is detected by the direction of deviation between the phases of the two lines of pulse signals, but this is not restrictive. For example, the focus drive control means 10 may monitor the drive control signal for controlling the direction of driving of the drive means 11 and detect the direction of movement of the focusing lens.

Second Embodiment

In the first embodiment, during the closing of the main switch, the position of the focusing lens and the content of the counter 17 are not coincident with each other and therefore, the lens is forcibly driven toward ∞ and when the lens arrives at the particular position (∞, the middle point or the close distance), the driving is stopped, and the content of the counter is initialized to the value corresponding to the lens position.

If this is done, the lens moves each time the main switch is closed, and this is cumbersome.

A second embodiment solves the above-noted disadvantage peculiar to the first embodiment, and does not require the lens to be moved for the initialization of the counter during the closing of the main switch.

In the second embodiment, during the opening of the main switch, the content of the counter is written into non-volatile memory means, for example, electrical erasable PROM (hereinafter referred to as $E^2$ PROM) and during the closing of the main switch, the content of the counter is initialized to the content of said $E^2$ PROM.

Figure 10A:
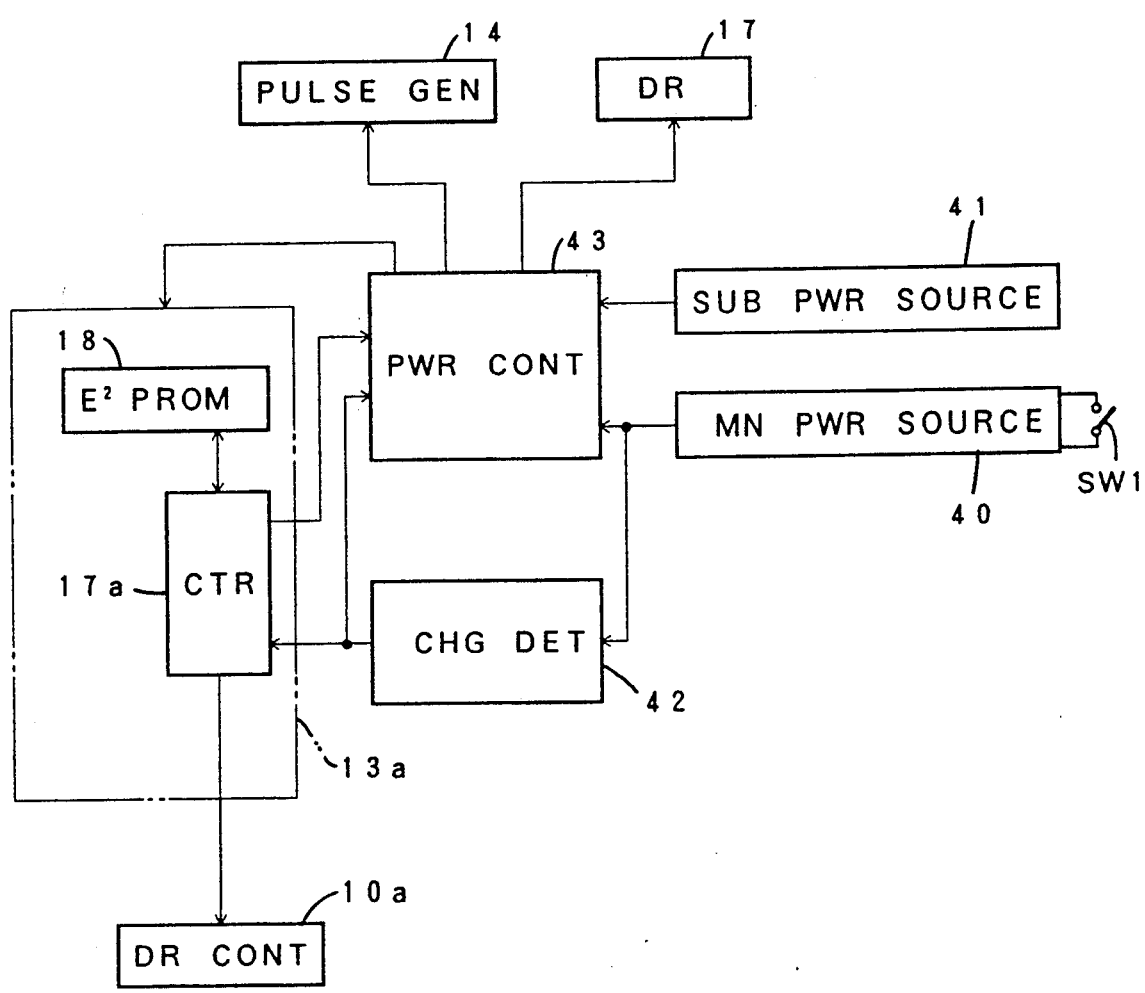
FIG. 10A shows the construction of an automatic focus detecting device which is a second embodiment of the present invention.

FIG. 10A shows the construction of the second embodiment of the present invention. In FIG. 10A, some of portions common to those of the first embodiment are not shown.

In FIG. 10A, constituents added to the first embodiment are $E^2$ PROM 18 which is an element of position detecting means 13a, a main power source 40 contained in the camera body 1, a sub power source 41 contained in the lens 2 side, power controlling means 43 and change detecting means 42. The points in which the position detecting means 13a differs from the position detecting means 13 of FIG. 3 are a counter 17a and $E^2$ PROM 18, and in the other points, the position detecting means 13a is the same as the position detecting means 13.

In the construction as described above, the second embodiment operates as follows during the opening of the main switch.

First, when a switch SW1 connected to the main power source 40 contained in the camera body 1 is opened, the change detecting means 42 detected that the voltage applied from the main power source 40 to each means is reduced, and sends the detection signal to count means 17a and the power controlling means 43. When the main power source 40 becomes OFF, the voltage applied to each circuit becomes zero after a predetermined time lag. The change detecting means 42 outputs the detection signal when the voltage applied from the main power source 40 becomes lower than a predetermined level.

The power controlling means 43 and the change detecting means 42 are normally supplied with electric power from the sub power source 41. The power controlling means 43 normally supplies the electric power from the main power source 40 to the pulse generating means 14, the position detecting means 13a and the drive means 11, but when it receives the detection signal, it supplies electric power from the sub power source 41 to the pulse generating means 14 and the position detecting means 13a. On the other hand, the power supply to the drive means 11, etc. is forcibly stopped by opening the switch SW1 even when the drive means 11 is driving.

The count means 17a writes the count content CNT thereof into $E^2$ PROM 18 after the lapse of a predetermined time (the time from after the drive means 11 is stopped until the movement of the focusing lens 6 by its inertia is terminated and the focusing lens 6 becomes completely stationary) from the point of time at which it receives the detection signal.

When the writing is completed, the count means 17a sends a completion signal to the power controlling means 43.

Upon receipt of the completion signal, the power controlling means 43 stops the supply of the sub power source 41 to the pulse generating means 14 and the position detecting means 13a.

Figure 10B:
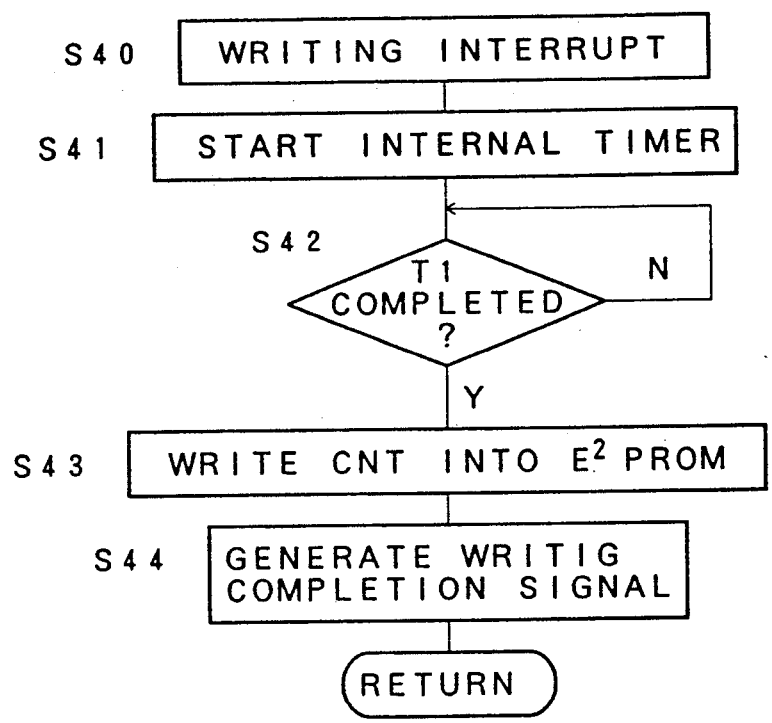
FIGS. 10B and 10C are flow charts showing the operation of the device of FIG. 10A.

The count means 17a is actually comprised of a part of a microcomputer, and the operation thereof is shown in the flow chart of FIG. 10B.

First, by the generation of the detection signal, the writing interrupt processing starts from step S40. At step S41, an internal timer is caused to start to count the aforementioned predetermined time T1 (the time until the focusing lens 6 is completely stopped). At step S42, whether the internal time has completed the counting of the aforementioned predetermined time T1 is judged. When the counting of the predetermined time is completed, shift is made to step S43, where the count content CNT is written into $E^2$ PROM 18, and at step S44, a writing completion signal is generated.

What has been described above is the operation of the second embodiment during the opening of the main switch.

Figure 10C:
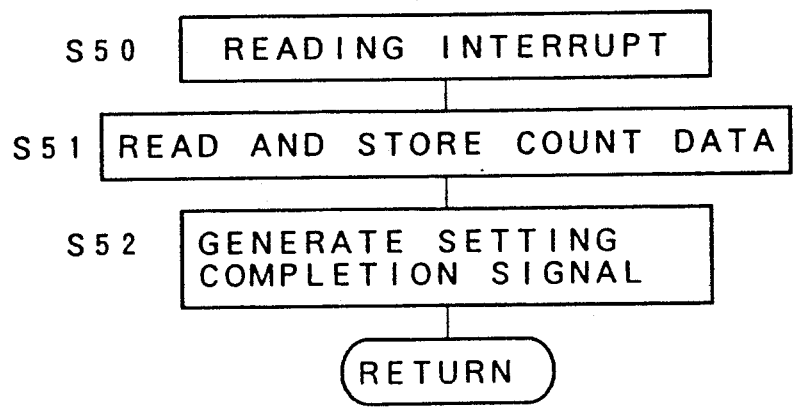
Figure 13:
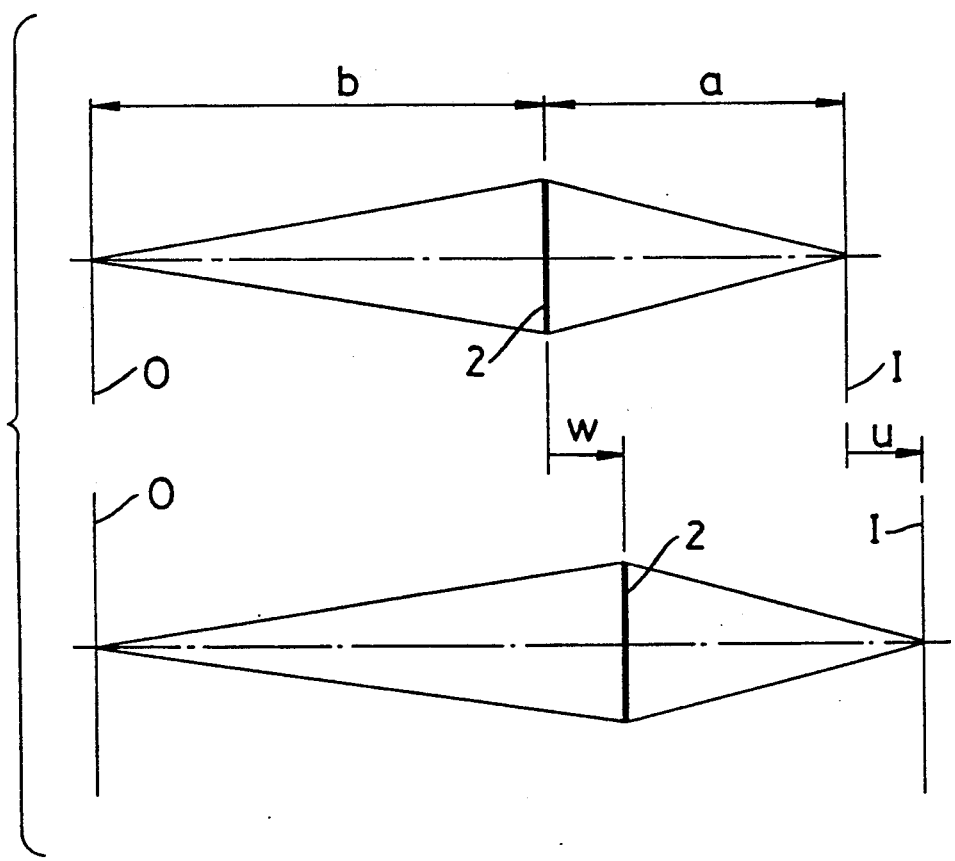
FIG. 13 illustrates the principle of the automatic focus detecting device according to the prior art.

The operation during the closing of the main switch will now be described with reference to the flow chart of FIG. 10C.

When the switch SW1 is closed, the power controlling means 43 supplies electric power from the main power source 40 to the pulse generating means 14, the position detecting means 13a, the drive means 11 and the focus drive control means 10a.

The focus drive control means 10a stops the drive means 11 at a point of time whereat the main power source 40 becomes ON.

The count means 17a is supplied with electric power from the main power source 40, and reading interrupt starts from step S50. At step S51, the count data of the count means 17a when the main power source 40 was OFF last is read from $E^2$ PROM 18, and is set to the count content. When the setting of the count content is completed, at step S52, a setting completion signal is sent to the focus drive control means 10a.

The focus drive control means 10a starts the drive control of the drive means 11 based on the amount of movement y sent from the move amount calculating means 8 after the counter setting completion signal has been generated.

What has been described above is the operation of the second embodiment during the closing of the main switch.

FIG. 11 shows a modification of the second embodiment shown in FIG. 10A, and more particularly shows an embodiment in which the main power source 40 is contained in the lens. A power source switch 44 is a switch for extraneously operating the ON and OFF of the power source, and during the closing of the main switch, electric power is supplied to the position detecting means 13a, the drive means 11, etc. by the construction of a mechanical switch, not shown.

During the opening of the main switch, the opening operation of the power source switch 44 is first detected by change detecting means 42a and the detection signal is sent to power controlling means 43 and count means 17a.

Upon receipt of the detection signal, the power controlling means 43 stops the supply of electric power to the means other than the pulse generating means 14 and the position detecting means 13a.

Next, upon receipt of the writing completion signal from the count means 17a, it stops the supply of electric power to the pulse generating means 14 and the position detecting means 13a, and renders the power source completely OFF.

In the embodiment of FIG. 11, the construction and operation of unshown portions are the same as those in the second embodiment of FIG. 10.

As described above, in the second embodiment, during the opening of the main switch, the content of the counter is retracted into the non-volatile memory and during the closing of the main switch, the data retracted into the non-volatile memory is read out and set in the counter and therefore, the second embodiment has the merit that the movement of the lens during the closing of the main switch as in the first embodiment is not required.

Third Embodiment

The present invention as it is applied to a zoom lens comprising a focusing lens and a magnification changing lens is a third embodiment, the construction of which is shown in FIG. 12, wherein the camera body is omitted.

In FIG. 12, the focusing lens 6 is behind the magnification changing lens 50 for the convenience of drawing, but actually is to be understood that the focusing lens 6 is forwardly of the magnification changing lens 50.

Zoom operation means 51 for effecting zoom-up and zoom-down is disposed in the interchangeable lens barrel 2a, and the operation information of the zoom operation means 51 is sent to zoom drive control means 52. The zoom drive control means 52 effects the drive control of drive means 53 in conformity with the operation information (such as the direction and speed of zooming).

The drive means 53 is connected to the magnification changing lens 50 by a drive system 54, and the magnification changing lens 50 is moved in the direction of the optic axis in conformity with the driving of the drive means 53. On the other hand, the drive system 54 is connected also to pulse generating means 56, which generates a pulse with the movement of the magnification changing lens 50. The construction relation among the magnification changing lens 50, the drive system 54 and the pulse generating means 56 is similar to the construction relation among the focusing lens 6, the drive system 12 and the pulse generating means 14 in the first embodiment.

The pulse generated by the pulse generating means 56 is sent to position detecting means 55.

The position detecting means 55, like the position detecting means 13a in the first and second embodiments, is comprised of direction detecting means, an encoder, $E^2$ PROM and a counter, and effects an operation similar to that of the first and second embodiments to thereby find the lens position h of the magnification changing lens 50 with the film surface as the reference and send it to move amount calculating means 8a.

Also, the focus drive control means 10, the drive means 11, the drive system 12 and the position detecting means 13a are entirely similar in construction to those in the first and second embodiments, and perform similar operations to thereby send the lens position Z of the focusing lens 6 with the film surface as the reference to the move amount calculating means 8a. Also, lens information means 9a sends the focal length $f_1$ of the focusing lens 6 and the focal length $f_2$ of the magnification changing lens 50 to the move amount calculating means 8a.

The move amount calculating means 8a calculates the aforementioned equations (9), (10), (12), (19), (20), (21) and (22) from the defocus amount x, the focusing lens position Z, the magnification changing lens position h, the focal length $f_1$ of the focusing lens and the focal length $f_2$ of the magnification changing lens and finds the amount of movement y of the focusing lens 6 to the in-focus point.

The amount of movement y of the lens found in this manner is sent to the focus drive control means 10, and the focus drive control means 10 controls the drive means 11 on the basis of the amount of movement y of the lens in the same manner as in the first and second embodiments, and moves the focusing lens 6 to thereby bring the image plane of the object into coincidence with the film surface.

The third embodiment is constructed and operates as described above and therefore can detect the focusing lens position Z and the magnification changing lens position h highly accurately, and the amount of movement y of the focusing lens to the in-focus point can be found only by calculation on the basis of the defocus amount x, the lens positions Z and h and the focal lengths $f_1$ and $f_2$, and the accuracy thereof is higher than in the prior art.

In the first, second and third embodiments, the move amount detecting means, the focus drive control means, the drive means and the position detecting means have been described as being contained in the lens side, and this is because the construction of the phototaking optical system differs from lens to lens and accordingly, the calculation equation for the calculation of the amount of movement also differs from lens to lens.

However, move amount calculating means in which a plurality of calculation equations are changed over by the lens is also possible and therefore, the present invention is not restricted to the constructions of the above-described embodiments, but is also applicable to a system in which said means are contained in the body side, a system in which the focus detecting means is contained in the lens, and a system in which the camera body and the lens are integral with each other.

Also, in the first embodiment, an example has been described in which the present invention is applied to a totally moved type optical system, and in the third embodiment, an example has been described in which the present invention is applied to an optical system comprising a focusing lens and a magnification changing lens, but of course, the present invention can also be applied to other optical systems other than these. For example, in an optical system comprising a plurality of lens groups, lens position detecting means are provided for the lens groups moved in the direction of the optic axis and the positions of those lenses are detected, and for the fixed lens group, the lens position thereof, with the focal length of each lens group, is stored as fixed memory information in lens information means. The move amount calculating means can calculate the amount of movement of the lens to the in-focus point of the focusing lens on the basis of the defocus amount x, the lens position from each lens position detecting means, and the lens position and focal length from the lens information means. The calculation equation can be found strictly or approximately on the basis of the formula of the lens as in the derivation described in connection with the principle.

According to the present invention, the pulse generating means is used for the position detecting means for the lens groups as well as for the drive control means for the lens groups and therefore, the resolving power of position detection can be made as high as the resolving power of position control and as a result, the amount of movement of the lens found by calculation can also be made highly accurate and the device can be made compact in terms of space, and this is advantageous in terms of cost.

Also, the position detecting means memorizes the position of the focusing lens at the point of time whereat the power source of the automatic focus adjusting device has been stopped and therefore, the accurate position of the focusing lens can be known even when the main switch is closed next time, and accurate drive control of the photo-taking optical system becomes possible.

I claim:

1. A camera including:
   a photo-taking optical system having a focusing lens movable in the direction of the optic axis for focus adjustment;
   pulse generating means generating a pulse signal for each predetermined amount of movement of said focusing lens in the direction of the optic axis;
   count means for counting said pulse signal;
   memory means;
   electric power supply means for supplying electric power to said count means, said count means using said electric power in order to operate; and
   switch means operated to stop and start the supply of electric power from said electric power supply means to said count means;
   said count means being responsive to the operation of said switch means for stopping the supply of electric power to write the content of said count means into said memory means, and responsive to the operation of said switch means for starting the supply of electric power to read the content of said memory means into said count means, said memory means continuing to store the contents thereof within the period from the stop to the start of the supply of electric power.

2. A camera according to claim 1, wherein said electric power supply means is designed to supply electric power to said pulse generating means.

3. A camera according to claim 2, having focus detecting means for detecting a light flux from an object passed through said photo-taking optical system and producing a defocus signal conforming to the defocus amount of the object image formed by said photo-taking optical system relative to a predetermined plane.

4. A camera according to claim 1, having another electric power supply means and electric power supply control means, the first mentioned electric power supply control means being responsive to the operation of said switch means for stopping the supply of electric power to cause said another electric power supply means to start the supply of electric power to said count means and said memory means.

5. A camera including:
   a photo-taking optical system having a focusing lens movable in the direction of the optic axis for focus adjustment;
   drive means for moving said focusing lens in the direction of the optic axis;

pulse generating means generating a pulse signal for each predetermined amount of movement of said focusing lens in the direction of the optic axis;

count means for counting said pulse signal;

means for outputting a first reset signal to said count means when said focusing lens is at a position whereat said photo-taking optical system is in focus to an object positioned at infinity;

means for outputting a second reset signal to said count means when said focusing lens is at a position whereat said photo-taking optical system is in focus to an object positioned at a close distance; and means for outputting a third reset signal to said count means when said focusing lens is at a predetermined position whereat said photo-taking optical system is in focus to an object between infinity and the close distance;

said count means being responsive to said first, second and third reset signals to reset the content of the count difference contents conforming to said first, second and third reset signals, respectively.

6. A camera according to claim 5, having focus detecting means for detecting a light flux from an object passed through said photo-taking optical system and producing a defocus signal conforming to the defocus amount of the object image formed by said photo-taking optical system relative to a predetermined plane.

7. A camera according to claim 5, which further comprises supply means for supplying electric power to said count means and said driving means, wherein said driving means moves said focusing lens in a predetermined direction after the supply of electric power from said supply means until one of said first, said second and said third reset signal is generated when said focusing lens is not at the position corresponding to said first reset signal.

8. A lens barrel removably mountable on a camera body having focus detecting means, said lens barrel including:

a photo-taking optical system having a focusing lens movable in the direction of the optic axis for focus adjustment;

pulse generating means generating a pulse signal for each predetermined amount of movement of said focusing lens in the direction of the optic axis;

drive means for moving said focusing lens in the direction of the optic axis;

count means for counting said pulse signal in conformity with the direction of movement of said focusing lens;

memory means in which data regarding the focal length of said focusing lens is fixedly stored;

move amount calculating means for calculating and outputting the direction and amount of movement of said focusing lens in accordance with a predetermined calculation equation on the basis of the content of said count means, the content of said memory means and the output of said focus detecting means; and drive control means for controlling said drive means on the basis of the calculation output of said move amount calculating means and the pulse signal of said pulse generating means.

9. A lens barrel according to claim 8, wherein said pulse generating means also generates a direction signal indicative of the direction of movement of said focusing lens.

10. A lens barrel according to claim 8, wherein said photo-taking optical system has a magnification changing lens movable in the direction of the optic axis for changing magnification of said photo-taking optical system, wherein first data regarding the focal length of said focusing lens and second data regarding the focal length of said magnification changing lens are fixedly stored in said memory means, wherein said lens barrel comprises position detecting means for detecting the position of said magnification changing lens and for producing a position detecting signal, and wherein said move amount calculating means calculates the direction and amount of movement of said focusing lens in accordance with said predetermined calculation equation on the basis of the contents of said count means, said first data, said second data, said position detecting signal and the output of said focus detecting means.

* * * * *